(12) United States Patent
Hanya et al.

(10) Patent No.: US 6,213,182 B1
(45) Date of Patent: Apr. 10, 2001

(54) PNEUMATIC TIRE HAVING SIDEWALL PORTIONS

(75) Inventors: Masahiro Hanya, Kobe; Kazuya Suzuki, Shirakawa, both of (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/112,316

(22) Filed: Jul. 9, 1998

(30) Foreign Application Priority Data

Jul. 11, 1997 (JP) .................................... 9-186915

(51) Int. Cl.[7] ................... B60C 3/00; B60C 9/02
(52) U.S. Cl. .................. 152/454; 152/548; 152/556
(58) Field of Search ..................... 152/454, 548, 152/550, 552, 554, 556

(56) References Cited

U.S. PATENT DOCUMENTS

| 4,096,899 | 6/1978 | Kitazawa et al. . | |
|---|---|---|---|
| 4,408,648 | * 10/1983 | Ohashi | 152/454 |
| 4,462,447 | 7/1984 | Siefert et al. . | |
| 4,955,417 | * 9/1990 | Igarashi | 152/454 |
| 5,119,857 | * 6/1992 | Kukimoto | 152/454 |
| 5,411,068 | * 5/1995 | Kogure | 152/454 |

FOREIGN PATENT DOCUMENTS

| 128852 | * 12/1984 | (EP) | 152/454 |
|---|---|---|---|
| 0652118 | 5/1995 | (EP) . | |
| 09300922 | 11/1997 | (JP) . | |

* cited by examiner

Primary Examiner—Steven D. Maki
(74) Attorney, Agent, or Firm—Birch, Stewart, Kolasch & Birch, LLP

(57) ABSTRACT

A pneumatic tire having an improved sidewall structure is disclosed, wherein a carcass comprises at least one carcass ply of cords, which comprises an axially innermost part extending through a sidewall potion from a belt edge to the axially inside of a bead core and an axially outermost part extending through the sidewall potion from the belt edge to the axially outside of the bead core, and the rubber thickness measured at the maximum tire section width point in the sidewall portion from the outer surface of the tire to the carcass cords in the axially outermost part being not more than 1.5 times the diameter of the carcass cords but not less than 0.2 mm.

12 Claims, 4 Drawing Sheets

PNEUMATIC TIRE HAVING SIDEWALL PORTIONS

The present invention relates to a pneumatic tire having a sidewall structure being capable of improving the tire weight, rolling resistance and road noise without deteriorating the maneuverability.

In general, in the sidewall portions of pneumatic tires, a sidewall rubber made of a hard rubber compound is disposed axially outside the carcass. The sidewall rubber has a minimum thickness which usually occurs around the maximum tire section width point and which is conventionally at least 2 to 4 mm. Generally speaking, the minimum thickness is at least 2 times the carcass cord diameter.

By the way, in various types of pneumatic tires, especially passenger car tires, the tire aspect ratio has a tendency to decrease, and the above-mentioned minimum thickness has a tendency to relatively increase as the aspect ratio decreases.

In such a sidewall structure, when the sidewall portion is bent with a relatively heavy tire load, the carcass cords are subjected to a large compressive force. As a cord has little resistance to a compressive force, there are problems with cord buckling, cord cut and cord separation from the surrounding rubber.

These problems can be solved by further increasing the thickness of the sidewall rubber. However, the tire weight inevitably increases. The rolling resistance is liable to increase because the energy loss in the sidewall rubber increases. Further, a noise during running is liable to increase because the transmission of vibrations from the tread potion to the bead potions is increased by the thick sidewall rubber. Further, if the sidewall rubber thickness is insufficient, the sidewall portions tend to be short of rigidity, causing a shortage of the tire stiffness, cornering power and cornering force. As a result, the steering stability is not good.

It is therefore an object of the present invention to provide a pneumatic tire, in which the tire weight, rolling resistance and noise are decreased, without decreasing the tire stiffness and deteriorating the steering stability and the like.

According to one aspect of the present invention, a pneumatic tire comprises
   a tread portion,
   a pair of sidewall portions,
   a pair of bead portions with a bead core therein,
   a carcass comprising at least one carcass ply of cords, and
   a belt disposed radially outside the carcass in the tread portion and having axial edges,
   the at least one carcass ply comprising an axially innermost part extending through one of the sidewall portions from one of the edges of the belt to the axial inside of one of the bead cores, and an axially outermost part extending through the sidewall potion from the edge of the belt to the axial outside of the bead core, and
   the rubber thickness measured at the maximum tire section width point in the sidewall portion from the outer surface of the tire to the carcass cords in the axially outermost part being not less than 0.2 mm but not more than 1.5 times the diameter of the carcass cords.

Therefore, the neutral line between the tensile strain and compressive strain produced in a sidewall portion during bending deformation shifts axially inwards. Accordingly, the stress acting on the axially outmost carcass cords turns to a tensile stress. As a result, the carcass cords can be prevented from the cord buckling, cutting and separation. Further, as the carcass cords display their full resistance to a tensile stress, the tire stiffness is maintained or increased, although the rubber thickness is decreased. Furthermore, as the rubber thickness is decreased, the rolling resistance and noise can be improved.

Embodiments of the present invention will now be described in detail in conjunction with the accompanying drawings.

Figure 1:
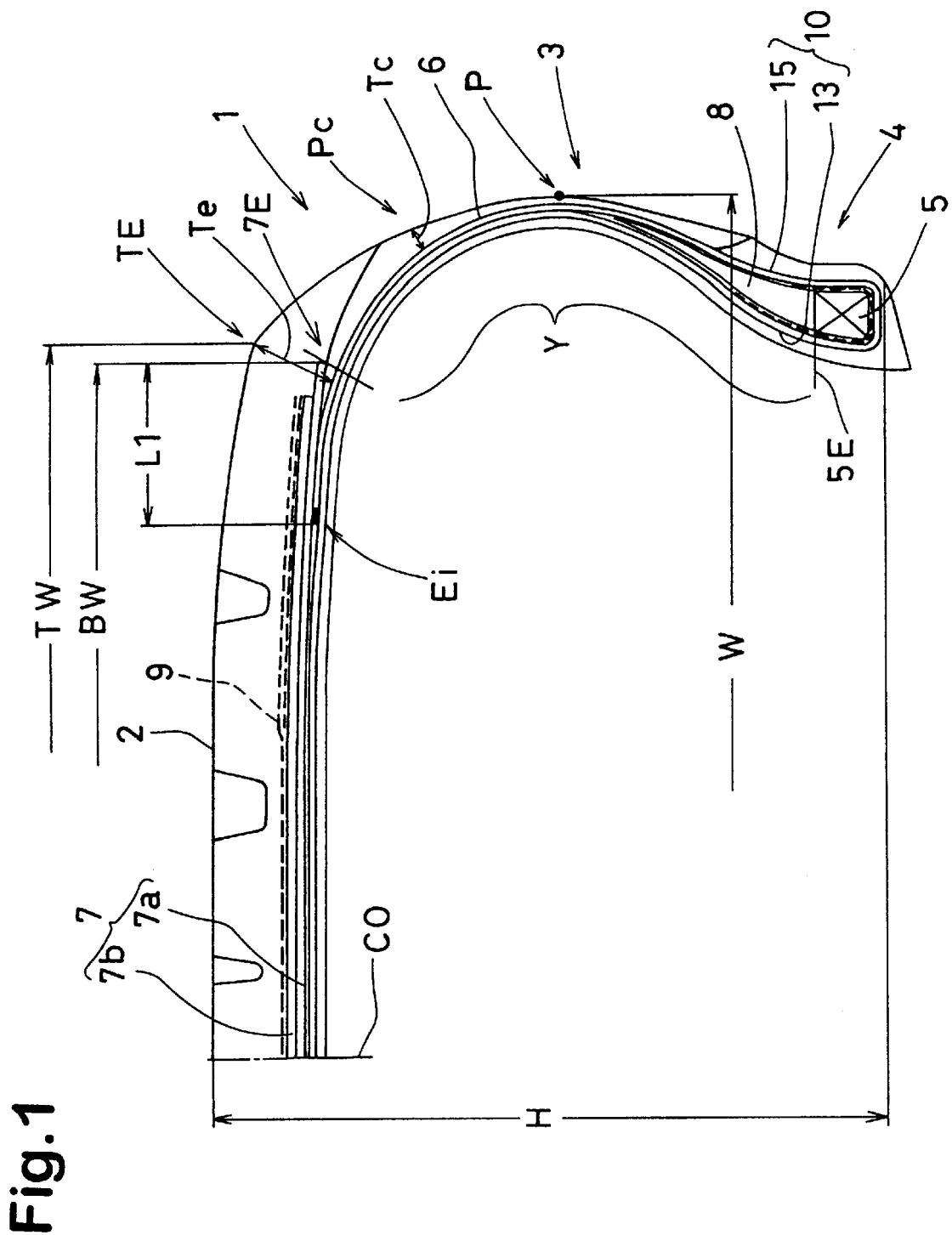
FIG.1 is a cross sectional view of an embodiment of the present invention showing an example of the carcass.

In the drawings, the pneumatic tire 1 according to the present invention is a passenger car radial tire whose aspect ratio (tire section height H/width W) is not more than 60%, for example 55%.

The tire 1 comprises a tread portion 2, a pair of sidewall portions 3, a pair of bead portions 4 with a bead core 5 therein, a carcass 6 extending between the bead portions 4, and a belt disposed radially outside the carcass 6 in the tread portion 2.

The belt comprises a breaker 7 and optionally, a band 9.

The breaker 7 comprises two cross plies 7a and 7b of parallel cords laid at an angle of from 10 to 30 degrees with respect to the tire equator CO. For the breaker cords, high elastic modulus cords, e.g. aromatic polyamide fiber cord, steel cord and the like are used. The breaker width BW or the width of the widest ply (in this example, radially inner ply 7a) is set in the range of from 0.9 to 1.1 times the tread width TW so as to reinforce the substantially overall width of the tread portion 2.

The band 9 is disposed radially outside the breaker 7 to prevent the tread portion 2 from being lifted radially outwardly during high speed running. In this example, the band 9 is made of spiral windings of at least one organic fiber cord, e.g. nylon and the like, and the cord angle is set in the range of not more than 5 degrees with respect to the tire equator CO.

The carcass 6 comprises at least one carcass ply of rubberized cords 11 which are arranged radially at an angle of from 70 to 90 degrees with respect to the tire equator CO. In the case of passenger car tires, organic fiber cords, e.g. polyester, nylon, rayon, aromatic polyamide and the like are preferably used for the carcass cords 11. The above-mentioned at least one carcass ply comprises an axially innermost part 13 which extends through the sidewall portion 3 from the belt edge TE to the axially inside of the bead core 5 and an axially outermost part 15 extending through the sidewall portion 3 from the belt edge TE to the axially outside of the bead core 5.

In FIG.1, the carcass 6 is composed of a single carcass ply 10 turned up around the bead cores 5 from the inside to the outside of the tire to form a pair of turnup portions and a main portion therebetween. Each turnup portion extends into the tread portion 2 beyond the breaker edge 7E and the end Ei thereof is located beneath the breaker 7. In this example, therefore, the above-mentioned axially outermost part 15, is defined by the turnup portion, and the axially innermost part 13 is defined by the main portion. The axial width L of the overlap of the turnup portion with the breaker 7 is set in the range of from 5 to 30 mm. If the overlap width is less than 5 mm, the force securing the carcass becomes insufficient. If more than 30 mm, the rigidity of the tread central portion is increased to deteriorate the ride comfort causing an unfavorable weight increase.

Figure 2:
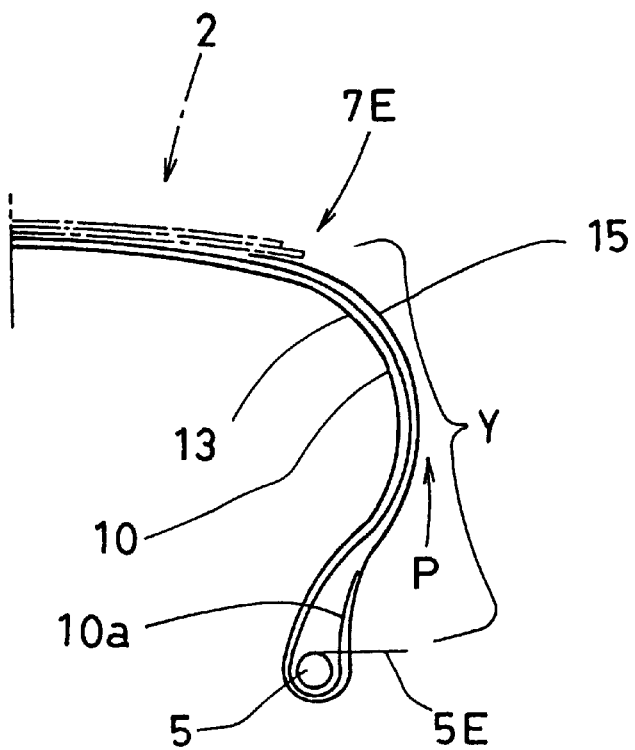
FIG.2 is a schematic cross sectional view showing another example of the carcass.

FIG.2 shows a modification of the carcass 6 shown in FIG.1, wherein a further carcass ply 10a is disposed in addition to the above-mentioned carcass ply 10. This ply 10a is also turned up around the bead cores 5 from the inside to the outside of the tire, but the turnup portion is terminated between the belt edge 7E and the radially outer end 5E of the bead core 5, preferably between the maximum tire section width point P and the bead core end 5E. This axially inner turnup portion may be extended into the tread portion 2. Thus the axially outermost part 15 and axially innermost part 13 are defined by the turnup portion and main portion of the carcass ply 10, respectively.

Figure 3:
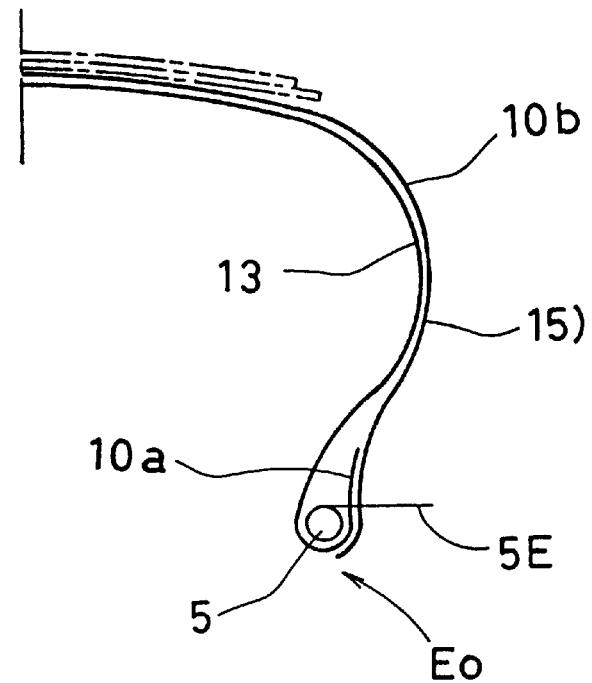
FIG.3 is a schematic cross sectional view showing still another example of the carcass.

FIG.3 shows another example of the carcass 6. In this example, the carcass is composed of an inner carcass ply 10a and an outer carcass ply 10b. The inner carcass ply 10a is extended between the bead portions 4 and turned up around the bead cores 5 from the inside to the outside of the tire and each turnup portion is terminated between the maximum tire section width point P and the radially outer end 5E of the bead core 5. The outer carcass ply 10b is extended between the bead portions 4 and somewhat turned around the bead core 5 from the outside to the inside of the tire, and the terminal end Eo thereof is positioned radially inward of the radially outer end 5E of the bead core 5, preferably under the bead core 5 to be secured between the bead core 5 and a wheel rim. In this example, the axially outermost part 15 and axially innermost part 13 are defined by the main portion of the outer carcass ply 10b and the main portion of the inner carcass ply 10a, respectively.

Each bead portion 4 is provided between the carcass ply main portion and turnup portion with a bead apex 8. The bead apex 8 is made of a hard rubber extending radially outwardly from the radially outside of the bead core 5 to the vicinity of the maximum tire section width point P, while tapering radially outwardly.

Figure 4:
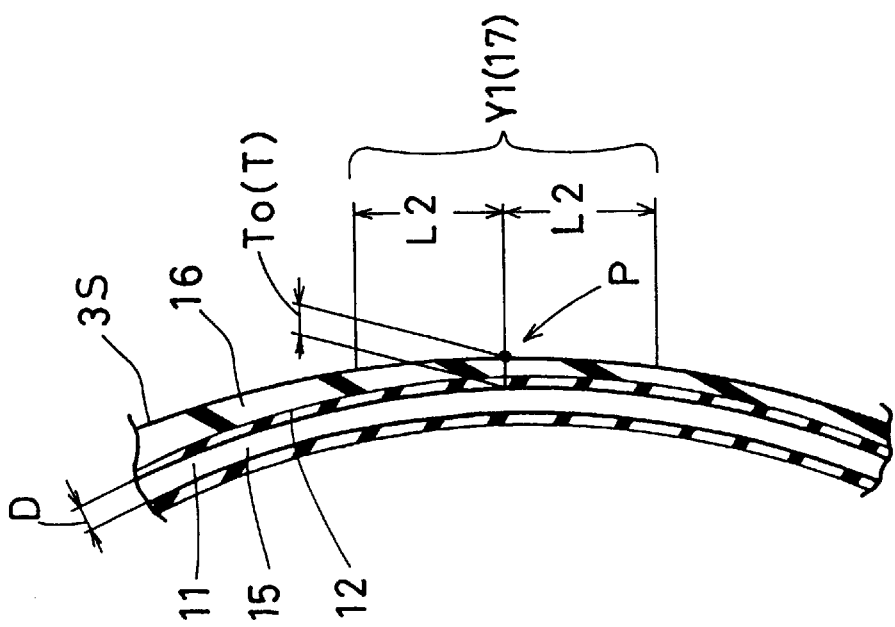
FIG.4 is an enlarged cross sectional view showing an example of the sidewall portion.

As shown in FIG.4, the rubber thickness T measured in the sidewall portions 3 from the outer surface 3S of the tire to the axially outmost carcass cords 11 is minimum at the maximum tire section width point P. The minimum thickness T0 at the maximum width point P is decreased into the range of not more than 1.5 times preferably 1.0 times the diameter D of the carcass cord 11. If the minimum thickness T0 is more than 1.5 D, it is difficult to improve the steering stability and the like. From a viewpoint of the rigidity, the rubber thickness T0 may be zero. However, from a viewpoint of the appearance, the minimum thickness T0 is preferably not less than 0.2 mm.

In this embodiment, the rubber thickness T is maintained at a substantially constant value, which is the same as the thickness T0 in a region Y1 which is defined as extending radially inward and outward from the point P by a distance L2 of at least 5% of the tire section height H. Then the thickness T increases towards the tread portion 2 and bead portion 4. The thickness Tc at the middle point Pc between the tread edge TE and the widest point P along the tire outer surface is in the range of from about 2 to 4 times the thickness T0, and the thickness Te measured at the tread edge TE is set in the range of about 6 to 15 times the rubber thickness T0.

Thus, the rubber thickness T is minimized in such a region where the deformation or deflection in bending is maximum.

Therefore, the neutral line between the tensile strain and compressive strain during deformation shifts axially inwards, and the stress acting on the axially outmost carcass cords 11 turns to a tensile stress. As a result, the rigidity increases, although the rubber thickness is decreased, and the steering stability can be effectively improved.

This effect to improve the steering stability becomes maximized in radial tires having a low aspect ratio of less than about 60% of which sidewall rubber is relatively thick. Therefore, the present invention is suitably applied to passenger car tires having an aspect ratio of not more than 60%.

On the premise that the tire profile or the tire sectional shape is not change, in other words, the tire vulcanization mold is the same, the tire inside volume or the volume of the air chamber increases in proportion to the decrease in the rubber thickness. Accordingly, the tire is increased in the load capacity, which decreases the tire deformation. As a result, the tire stiffness and rolling resistance are improved. Further, it becomes possible to improve road noise and the like.

Incidentally, on the inside of the carcass, only a thin airtight inner liner 20 is disposed.

As one of methods of decreasing the rubber thickness T0 as explained above, the thickness of a raw sidewall rubber 16 which is applied to the axially outside of the carcass 6 is decreased as shown in FIG.4.

Figure 6:
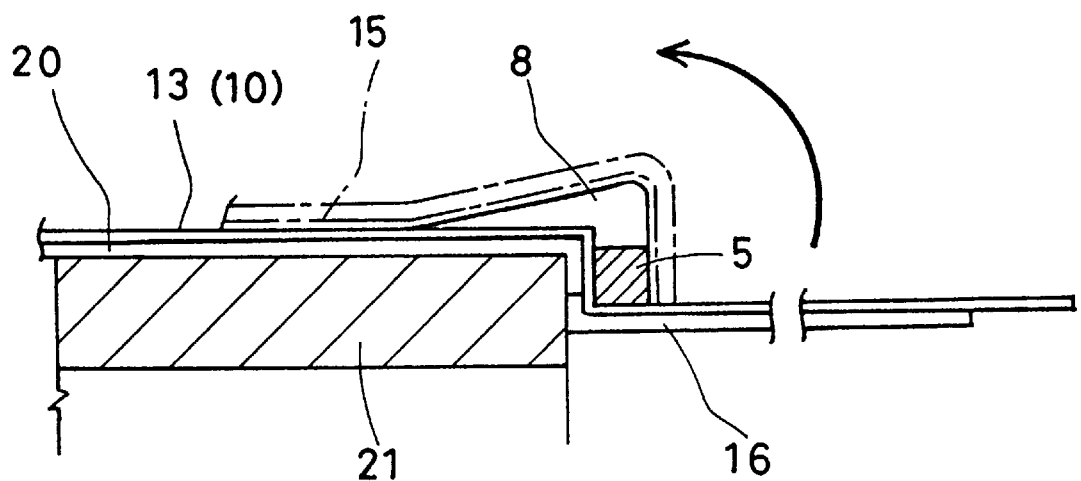
FIG.6 is a cross sectional view for explaining a method of making the tire.

In this case, as shown in FIG.6, an assembly of the thin sidewall rubber 16 and an inner liner rubber 20 is first applied to a tire building drum 21, and the carcass ply 10, 10a is wound thereon. Then, the carcass ply 10, 10a is turned up around the bead core 5 together with the sidewall rubber 16. Thus the working efficiency can be improved.

Figure 5:
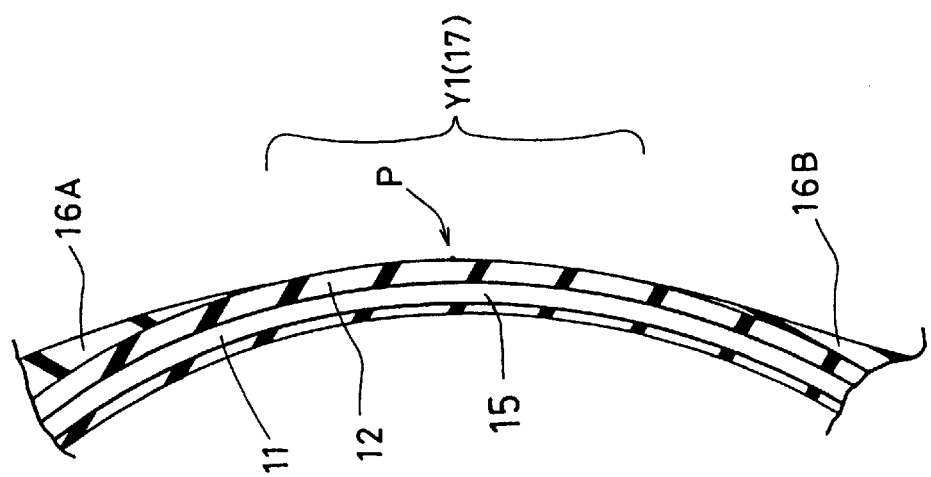
FIG.5 is an enlarged cross sectional view showing another example of the sidewall portion.

FIG.5 shows another method, wherein the thickness of a topping rubber 12 for the carcass ply 10 is increased on the outside of the carcass than the inside. The sidewall rubber is divided into a radially outer and inner sidewall rubbers 16A and 16B. The radially outer and inner sidewall rubbers 16A and 16B are applied to the axially outside of the outer topping rubber 12, leaving the above-mentioned region Y1 to form the above mentioned constant-thickness part 17.

As a modification of this method, it is possible to eliminate the above-mentioned sidewall rubbers 16A and 16B by making a radially inwardly extending part on the tread rubber 18 and a radially outwardly extending part on the bead rubber 19, and by using these extended parts as a substitute for the above-mentioned radially divided sidewall rubbers 16A and 16B. Thus the production efficiency is further improved. Comparison Tests Test tires of size 195/55R15 were made by way of test according to the structure shown in FIG.1 and the specifications given in Table 1, and the tire weight, rolling resistance, road noise, steering stability, ride comfort, vertical stiffness, lateral stiffness, cornering power, cornering force were measured.

The test tires were the same structure shown in FIG.1 except for the rubber thickness in the sidewall portions. The carcass was composed of 1 ply of 1500d/2 polyester cords arranged radially at 88 to 90 degrees to the tire equator. (cord count: 50 ends/5 cm) The belt was composed of two breaker plies of steel cords. (cord angle: +24 and −24 degrees, cord count: 40 ends/5 cm)

The specifications and test results are shown in Table 1. Tire Weight Test

The weight of each tire was measured, and the results are indicated by an index based on Ref.1 being 100, wherein the smaller the index, the lighter the tire. Rolling Resistance Test The rolling resistance was measured with a tester under the following conditions. The results are indicated by an index based on the prior art tire being 100, wherein the smaller the index, the smaller the resistance.

| Wheel rim: | 15X6JJ standard |
|---|---|
| Inner pressure: | 200 kpa |
| Running speed: | 80 km/h |
| Tire load: | 360 kgf |

Road Noise Test

As a test car a 1600cc FF passenger car provided on all the wheels with a test tire was run on a rough road surface of a paved test course, and during running at a constant speed of 50 km/h, the overall noise level in dB(A) was measured near the driver's left (inside) ear and in the center of the rear seat at the ears' height. The mean value at these two positions are shown in Table 1 as a difference from that of prior art tire. Thus, the minus sign means that the noise level is lower than prior art tire Steering Stability Test and Ride Comfort Test Running the test car in a dry paved test course, the test driver evaluated the steering stability and ride comfort into ten ranks wherein the prior art tire was ranked as six and the larger the index, the better the performance. Vertical Stiffness Test The variation in the vertical strain of the tire when the tire load is varied plus/minus 50 kgf from 360 kgf (or 310 to 410 kgf) was measured. In Table 1, as the vertical stiffness, the reciprocal of the measured variation is indicated by an index based on prior art tire being 100. Thus, the larger the index, the smaller the tire deformation. Lateral Stiffness Test The lateral strain of the tire when a lateral force of 50 kgf is applied to the tire under a constant tire load of 360 kgf was measured. In table, as the lateral stiffness, the reciprocal of the measured strain is indicated by an index based on prior art tire being 100. Thus, the larger the index, the smaller the tire deformation. Cornering Power Test and Cornering Force Test Using an indoor tire tester, the cornering power (side force at a slip angle of 1 degree) and the cornering force (side force at a slip angle of 12 degrees) were measured. In Table 1, the results are indicated by an index based on prior art tire being 100, wherein the larger the index, the large the side force.

according to the invention can be improved in the tire weight, rolling resistance and road noise.

What is claimed is:

1. A pneumatic tire comprising
    a tread portion,
    a pair of sidewall portions,
    a pair of bead portions each with a bead core therein,
    a carcass comprising at least one carcass ply of cords, and
    a belt disposed radially outside the carcass in the tread portion and having axial edges,
    said at least one carcass ply comprising
        an axially innermost part extending through one of the sidewall portions from one of the edges of the belt to the axial inside of one of the bead cores; and
        an axially outermost part extending through the sidewall portions from the edge of the belt to the axial outside of the bead core,
    rubber thickness T0 measured at the maximum tire section width point P in the sidewall portion from the outer surface of the tire to the carcass cords in the axially outermost part being not less than 0.2 mm but not more than 1.5 times the diameter D of the carcass cords;
    wherein in a region Y1, which is defined as extending radially inward and outward from the maximum tire section width point P by a distance L2 of at least 5% of the section height H of the tire,
    rubber thickness T measured from the outer surface of the tire to the carcass cords in the axially outermost part is substantially constant, rubber thickness Tc measured at a middle point Pc between a tread edge TE and the maximum tire section width point P along the tire outer surface is in the range of from 2 to 4 times the rubber thickness T0 at the maximum tire section width point P, and
    rubber thickness Te measured at the tread edge TE is in the range of 6 to 15 times the rubber thickness T0.

2. The pneumatic tire according to claim 1, wherein
    said at least one carcass ply is a single ply which is extended between the bead portions and turned up around the bead cores from the inside to the outside of the tire to form a pair of turnup portions and a main portion therebetween, and

TABLE 1

| Tire | Prior | Ref.1 | Ref.2 | Ex.1 | Ex.2 | Ex.3 | Ex.4 | Ex.5 |
|---|---|---|---|---|---|---|---|---|
| Carcass cord dia. D (mm) | 1.0 | 1.0 | 1.0 | 1.0 | 1.0 | 1.0 | 1.0 | 1.0 |
| Rubber thickness T0 (mm) | 3.0 | 2.5 | 1.6 | 1.4 | 1.1 | 0.7 | 0.4 | 0.2 |
| T0/D | 3.0 | 2.5 | 1.6 | 1.4 | 1.1 | 0.7 | 0.4 | 0.2 |
| Test results | | | | | | | | |
| Tire weight | 100 | 98 | 94 | 93 | 92 | 91 | 90 | 89 |
| Rolling resistance | 100 | 96 | 95 | 93 | 92 | 90 | 89 | 85 |
| Road noise | 0 | −0.1 | −0.1 | −0.5 | −0.5 | −0.6 | −0.6 | −0.9 |
| Steering stability | 6 | 6 | 6 | 6 | 6 | 6 | 6 | 6 |
| Ride comfort | 6 | 6 | 6 | 6 | 6 | 6 | 6 | 6 |
| Vertical stiffness | 100 | 100 | 99 | 99 | 99 | 102 | 101 | 102 |
| Lateral stiffness | 100 | 96 | 94 | 98 | 100 | 101 | 100 | 101 |
| Cornering power | 100 | 97 | 96 | 99 | 100 | 102 | 101 | 104 |
| Cornering force | 100 | 98 | 95 | 100 | 99 | 101 | 101 | 103 |

From Table 1, it was confirmed that, although Example tires 1 to 5 were greatly decreased in the thickness T0, the vertical stiffness and lateral stiffness can be maintained or improved to increase the cornering power and cornering force. Thus the steering stability could be improved, though it was difficult to obtain a pronounced effect from the driver's feeling tests. It was also confirmed that the tires said axially outermost part is defined by one of the turnup portions.

3. The pneumatic tire according to claim 1, wherein said at least one carcass ply is
    an inner ply which extends between the bead portions and is turned up around the bead cores from the inside to the outside of the tire to form a pair of turnup portions and a main portion therebetween, and an outer ply which extends at least between the bead portions, and said axially outermost part is defined by the outer ply.

4. The pneumatic tire according to claim 1, wherein in said region Y1, the rubber between the outer surface of the tire and the carcass cords is a topping rubber of the axially outermost part of said at least one carcass ply.

5. A pneumatic tire comprising a tread portion, a pair of sidewall portions, a pair of bead portions each with a bead core therein, a carcass comprising at least one carcass ply of cords, and a belt disposed radially outside the carcass in the tread portion and having axial edges, said at least one carcass ply comprising an axially innermost part extending through one of the sidewall portions from one of the edges of the belt to the axial inside of one of the bead cores; and an axially outermost part extending through the sidewall portions from the edge of the belt to the axial outside of the bead core, rubber thickness T0 measured at the maximum tire section width point P in the sidewall portion from the outer surface of the tire to the carcass cords in the axially outermost part being not less than 0.2 mm but not more than 1.5 times the diameter D of the carcass cords, such that a neutral line between tensile strain and compressive strain during deformation at the maximum tire width point with rubber thickness T0 shifts axially inwards, and stress acting on outermost carcass cords becomes a tensile stress, to thereby increase rigidity of the sidewall portions;

wherein rubber thickness T is substantially constant in a region Y1, which is defined as extending radially inward and outward from the maximum tire section width point P by a distance L2 of at least 5% of a given tire section height H, and a rubber thickness TC at a middle point PC between a tread edge TE and the point P along the tire outer surface is in the range of 2 to 4 times the thickness T0, and rubber thickness Te measured at the tread edge TE is set in the range of about 6 to 15 times the thickness T0.

6. The pneumatic tire according to claim 4 wherein the rubber thickness T is constant in the region Y1.

7. A pneumatic tire comprising a tread portion, a pair of sidewall portions, a pair of bead portions each with a bead core therein, a carcass comprising at least one carcass ply of cords, and a belt disposed radially outside the carcass in the tread portion and having axial edges, said at least one carcass ply comprising an axially innermost part extending through one of the sidewall portions from one of the edges of the belt to the axially inside of one of the bead cores; and an axially outermost part extending through the sidewall portions from the edge of the belt to the axially outside of the bead core, and rubber thickness T0 measured at the maximum tire section width point P in the sidewall portion from the outer surface of the tire to the carcass cords in the axially outermost part being not less than 0.2 mm but not more than 1.0 times the diameter D of the carcass cords;

wherein in a region Y1, which is defined as extending radially inward and outward from the maximum tire section width point P by a distance L2 of at least 5% of the section height H of the tire, rubber thickness T measured from the outer surface of the tire to the carcass cords in the axially outermost part is substantially constant, rubber thickness Tc measured at a middle point Pc between a tread edge TE and the maximum tire section width point P along the tire outer surface is in the range of from 2 to 4 times the rubber thickness T0 at the maximum tire section width point P, and rubber thickness Te measured at the tread edge TE is in the range of from 6 to 15 times the rubber thickness T0.

8. The pneumatic tire according to claim 7, wherein the rubber thickness T measured from the outer surface of the tire to the carcass cords in the axially outermost part is constant.

9. The pneumatic tire according to claim 7, wherein the rubber thickness T measured from the outer surface of the tire to the carcass cords in the axially outermost part is constant, and in said region Y1, the rubber between the outer surface of the tire and the carcass cords is a topping rubber of the axially outermost part of said at least one carcass ply.

10. The pneumatic tire according to claim 7, wherein said at least one carcass ply is a single ply which is extended between the bead portions and turned up around the bead cores from the inside to the outside of the tire to form a pair of turnup portions and a main portion therebetween, and said axially outermost part is defined by one of the turnup portions.

11. The pneumatic tire according to claim 7, wherein said at least one carcass ply is an inner ply which extends between the bead portions and is turned up around the bead cores from the inside to the outside of the tire to form a pair of turnup portions and a main portion therebetween, and an outer ply which extends at least between the bead portions, and said axially outermost part is defined by the outer ply.

12. A pneumatic tire comprising a tread portion, a pair of sidewall portions, a pair of bead portions each with a bead core therein, a carcass comprising at least one carcass ply of cords, and a belt disposed radially outside the carcass in the tread portion and having axial edges, said at least one carcass ply comprising an axially innermost part extending through one of the sidewall portions from one of the edges of the belt to the axially inside of one of the bead cores; and an axially outermost part extending through the sidewall portions from the edge of the belt to the axially outside of the bead core, and rubber thickness T0 measured at the maximum tire section width point P in the sidewall portion from the outer surface of the tire to the carcass cords in the axially outermost part being not less than 0.2 mm but not more than 1.0 times the diameter D of the carcass cords;

wherein in a region Y1 which is defined as extending radially inward and outward from the maximum tire section width point P by a distance L2 of at least 5% of the section height H of the tire, rubber thickness T measured from the outer surface of the tire to the carcass cords in the axially outermost part being substantially constant, and in said region Y1, the rubber between the outer surface of the tire and the carcass cords is a topping rubber of the axially outermost part of said at least one carcass ply, and wherein rubber thickness Tc measured at a middle point Pc between a tread edge TE and the maximum tire section width point P along the tire outer surface is in the range of from 2 to 4 times the rubber thickness T0 at the maximum tire section width point P, and rubber thickness Te measured at the tread edge TE is in the range of from 6 to 15 times the rubber thickness T0.

\* \* \* \* \*